L. MONTUPET.
DETACHABLE WHEEL.
APPLICATION FILED AUG. 2, 1912.
1,083,334.
Patented Jan. 6, 1914.
2 SHEETS—SHEET 1.
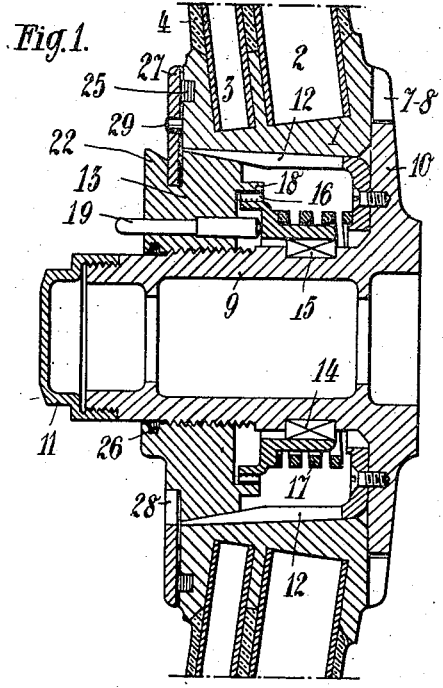
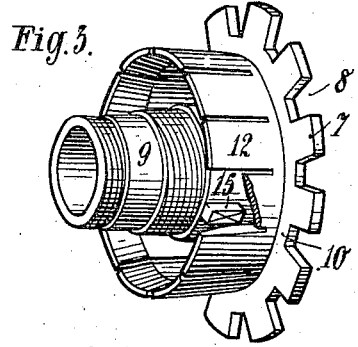
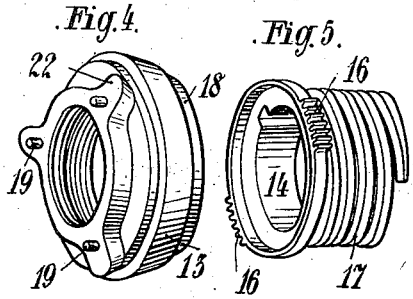
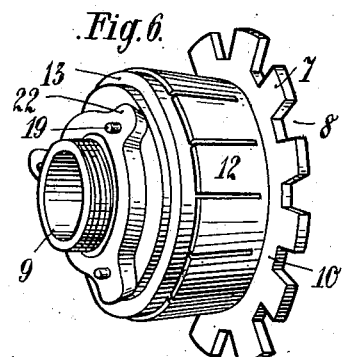
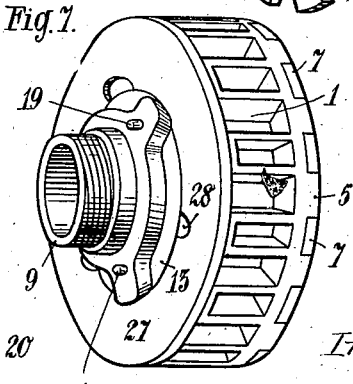
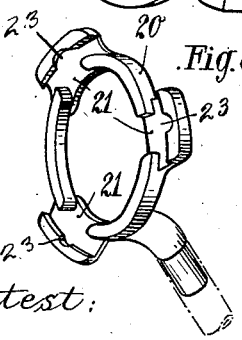
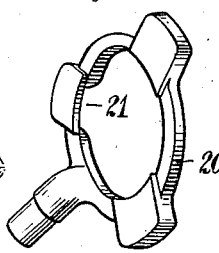
Attest:
Gerd L. Tolson
H. L. Alden
Inventor:
Léon Montupet,
by Spear Middleton Donaldson & Spear
Attys.

L. MONTUPET.
DETACHABLE WHEEL.
APPLICATION FILED AUG. 2, 1912.
1,083,334.
Patented Jan. 6, 1914.
2 SHEETS—SHEET 2.
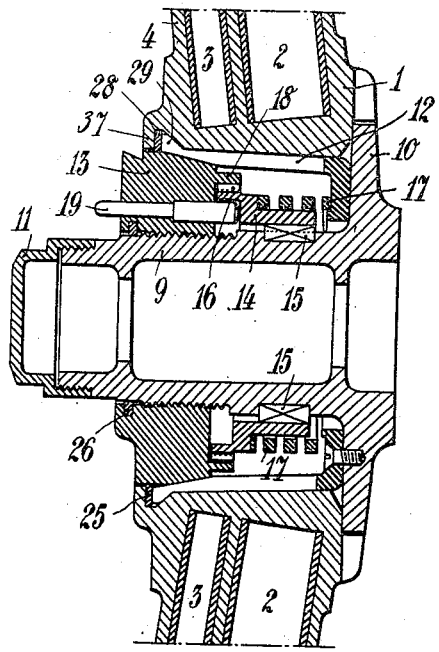
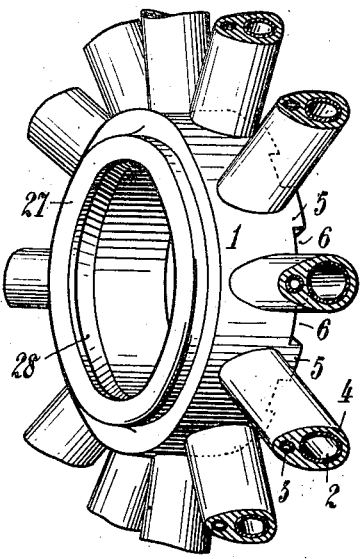
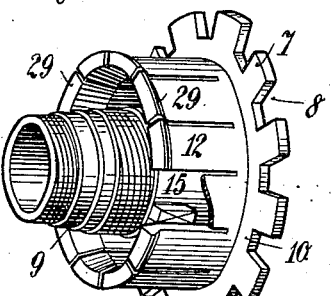
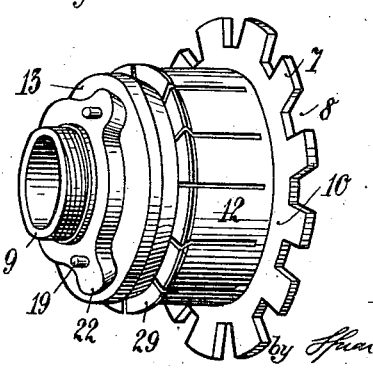
Inventor:
Léon Montupet,

UNITED STATES PATENT OFFICE.

LÉON MONTUPET, OF PARIS, FRANCE, ASSIGNOR TO LA SOCIETE MONTUPET & CIE., OF NOGENT-LES-VIERGES, OISE, FRANCE.

DETACHABLE WHEEL.

,083,334.   Specification of Letters Patent.   Patented Jan. 6, 1914.

Application filed August 2, 1912. Serial No. 712,911.

*To all whom it may concern:*

Be it known that I, LÉON MONTUPET, a citizen of the French Republic, residing in Paris, France, have invented certain new and useful Improvements in Detachable Wheels, of which the following is a specification.

This invention relates to a construction of detachable wheel strengthened aluminium which is also interchangeable, that is to say, this construction enables a damaged wheel to be instantaneously replaced by another one in good condition.

Compared to the systems of the same kind hitherto known, the invention is characterized by the connection of the wheel to the axle journal being effected by means of a false hub which remains constantly secured to the said journal and which itself comprises all the parts intended to secure the wheel in position as well as to insure automatic locking of the said parts for the purpose of preventing them from becoming unscrewed.

According to this invention, the wheel is secured in position on the journal by means of a conical expanding sleeve secured to a false hub permanently secured to the said journal, and coöperating with a conical nut which it is sufficient to screw or to unscrew to a few turns in order to enable the wheel to be secured to, or removed from, the false hub, the said nut being itself held in position by an automatic locking device which cannot be operated except by a special spanner.

In the accompanying drawing given by way of example, Figure 1 shows in cross-section the central portion of a wheel in position on the false hub, Fig. 2. shows in perspective the central portion of the wheel removed from the false hub, Figs. 3–5 show the false hub and the expanding and locking parts, Fig. 6 shows the same parts after fitting, ready to receive the wheel, Fig. 7 shows the hub of the wheel mounted on the false hub, Figs. 8 and 9 show in perspective the rear and front faces of the operating spanner, and Figs. 10–13 relate to a modified construction.

This detachable wheel comprises the wheel proper, constituted by metal frame work comprising a central hub 1 and tubes 2 and 3 arranged parallel in couples, mounted radially in pairs about the hub 1 and connected in any suitable manner to the rim. This metal frame-work is then inclosed in a casing of some light metal with comparatively low melting point such as aluminium. The hub or core 1 is provided on one of its faces with radial sectors 5, 6 alternately projecting and recessed, intended to coöperate with sectors 7, 8 of the same arrangement provided on the false hub. The latter part consists of a box 9 provided at one of its ends with a cheek or flange 10 provided with the above mentioned sectors 7, 8, and receives on its other end which is screwthreaded for the purpose, the cap 11 of the wheel. To the inner face of the flange 10 is secured the shoulder of an expanding segmented ring 12, the different segments of which are intended to apply with their outer surfaces against the inner bore of the core or hub 1 of the wheel, which is slightly conical, the large base of the cone being directed toward the exterior of the car. On the box 9 is screwed a nut 13 (Fig. 4), the circumference of which is conical, the said nut being introduced into the expanding ring 12 in order to force its segments against the inner bore of the hub 1, the latter thus being firmly secured against the flange 10 on the one hand, and on the expanding ring 12 on the other hand.

On the box or sleeve 9, between the nut 13 and the flange 10, can slide longitudinally a sleeve 14 (Fig. 5) rotating together with the said box 9 owing to the use of keys 15 or of any other suitable device. This sleeve 14 is provided with a toothed rim 16 which, owing to the action of a spring 17, has always the tendency to engage with another toothed rim 18 provided on the nut 13. This sleeve 14 forms the safety locking device for the nut 13, so as to prevent it from becoming loose when the wheel is fixed in position. Against the face of the rim 16 opposite the spring 17, rests the ends of drivers 19 distributed on the circumference in any number and operated from the outside by a special spanner enabling, at the same time the nut 13 to be turned in order to tighten or loosen it. The said spanner is constituted by a ring 20 provided with a handle and carrying a certain number of cells 21 with which engage radial bosses 22 provided on the nut 13, so that the said nut can be gripped in an efficacious manner in order to turn it in one or in the other direction. The bottom of each of the cells 21 is constituted by a plate provided with a flange with a dove tail groove, with which engages the beveled edge of the boss 22 of the nut 13. During the engagement of the spanner with the nut 13, these beveled ends of the bosses 22 pass through recesses 23 made on the flanges of the cells 21.

The whole construction is completed by a counter-cheek or flange 27 held against the corresponding face of the disk 1 by the bosses of the nut 13. Recesses 28 provided at the inner edge of the counter-cheek 27, the number of which corresponds to that of the bosses 22 of the nut 13, enable the said counter cheek to be put in place or removed, without its being necessary to remove the nut 13. The counter cheek 27 is held in place on the hub 1 by means of a pin 29 provided on the front face of the said hub. Leather packing 25 inserted between the counter cheek 27 and the hub or core 1, prevents dirt, dust or water from getting into the interior of the mechanism. Another leather packing 26 serving the same purpose, is arranged between the box 9 and the nut 13.

The working is as follows: The false hub 9 previously provided with its expanding ring 12 as well as with its keys 15, having been placed on the journal, into the interior of the said ring are successively introduced the spring 17, the safety sleeve 14, then the nut 13 provided with its drivers 19 which it is sufficient simply to bring near the ring 12 without exercising any action on the same. The wheel is then placed on the whole of these parts, taking care that the solid sectors 5 of the grips of its hub 1 should engage with the recessed sectors 8 of the grips of the flange 10 of the false hub. After the cheek 27, in the form shown in Fig. 1, has been placed in position, the special spanner 20 is then placed on the nut 13, the bottoms of the cells 21 being simultaneously applied with pressure against the drivers 19. These manipulations result in the sleeve 14 being pushed away, and its teeth 16 disengaged from the teeth 18 of the nut 13, so that the latter can be screwed home, until the expanding ring 12 is absolutely wedged in the hub 1 of the wheel. The detachable wheel is then fitted. It remains merely to remove the spanner 20, which releases the drivers 19 which return to their original position under the action of the spring 17 and of the safety sleeve 14. The engagement of the teeth 16 and 18 then takes place automatically, and the nut 13 is thus fixed in an absolute manner. Only a subsequent use of the spanner 20 will enable it to be again released, and the wheel removed.

In the modified construction forming the subject of Figs. 10–13 corresponding respectively to Figs. 1, 7, 3, 6, the counter cheek 27 which was arranged on the nut 13 and applied against the hub, has been done away with. The spokes 2 and 3 are arranged radially about the hub 1 and made integral with the latter by being embedded in the solid spoke 4 constituted by a light fusible alloy such as for instance an aluminium alloy. The hub 1 for erecting the wheel engages over an expanding ring 12 made of segments, belonging to the false hub, the front conical edge of which forms a series of wedges 29. These wedges are intended to engage by means of their inner conical surfaces, with the corresponding outer surface of the tightening nut 13, and with a groove 28 provided at the back of the flange 37 of the hub 1. The object of this arrangement to prevent the wheel from accidentally coming off the false hub in the event of the conical nut 13 being for some reason insufficiently tightened.

What I claim as my invention and desire to secure by Letters Patent is:—

1. A detachable wheel mechanism comprising in combination a false hub, a removable wheel member adapted to engage over, and abut against a shoulder on, the false hub and having an inner conical bearing surface tapering inwardly of the vehicle, a resilient annular member secured within the false hub and adapted to fit the conical surface in the wheel-hub, a nut adapted to be screwed on the false hub and having an inwardly tapering outer conical surface adapted to engage with a corresponding inner surface in said resilient member and to force it into engagement with the hub, and means arranged exclusively within the false hub for locking the nut to said false hub.

2. A detachable wheel mechanism comprising in combination a false hub, a removable wheel member adapted to engage over the false hub and having an inner conical bearing surface tapering inwardly of the vehicle and a sloping groove at the large diameter end of said surface, an annular conical segmentally split member attached at its inner small end to the false hub and having a wedge-shaped annular rib at its outer large end, a nut adapted to be screwed on the false hub and having an inwardly tapering outer conical surface adapted to engage with a corresponding inner surface in said conical member and to force its outer surface into engagement with the bearing surface in the wheel member and its wedge-shaped rib into engagement with the sloping groove in said wheel member, and means arranged exclusively within the false hub for locking the nut to said false hub.

In testimony whereof I have signed my name to this specification in the presence of two subscribing witnesses.

LÉON MONTUPET.

Witnesses:
VICTOR DUPONT,
GEORGES BONNEISIL.